US012667994B2

(12) United States Patent
Fu et al.

(10) Patent No.: US 12,667,994 B2
(45) Date of Patent: Jun. 30, 2026

(54) TRANSPARENT WOOD SURFACE IMPRINTING OPTICAL DEVICE AND APPLICATION THEREOF

(71) Applicant: NANJING FORESTRY UNIVERSITY, Nanjing (CN)

(72) Inventors: QiLiang Fu, Nanjing (CN); YuJie Chen, Nanjing (CN); Yue Jiao, Nanjing (CN); Lei Ye, Nanjing (CN); Zhi Yang, Nanjing (CN); ChangTong Mei, Nanjing (CN); Yan Wu, Nanjing (CN); KaiLi Wang, Nanjing (CN)

(73) Assignee: NANJING FORESTRY UNIVERSITY, Nanjing (CN)

( * ) Notice: Subject to any disclaimer, the term of this patent is extended or adjusted under 35 U.S.C. 154(b) by 308 days.

(21) Appl. No.: 18/451,821

(22) Filed: Aug. 17, 2023

(65) Prior Publication Data

US 2024/0383169 A1 Nov. 21, 2024

Related U.S. Application Data

(63) Continuation of application No. PCT/CN2023/095229, filed on May 19, 2023.

(30) Foreign Application Priority Data

May 15, 2023 (CN) ......................... 202310544424.3

(51) Int. Cl.
*B27K 3/02* (2006.01)
*B27K 3/15* (2006.01)
*B27K 3/36* (2006.01)

(52) U.S. Cl.
CPC .......... *B27K 3/0278* (2013.01); *B27K 3/0207* (2013.01); *B27K 3/15* (2013.01); *B27K 3/36* (2013.01)

(58) Field of Classification Search
CPC ...... B27K 3/0278; B27K 3/0207; B27K 3/15; B27K 3/36
See application file for complete search history.

(56) References Cited

FOREIGN PATENT DOCUMENTS

| | | | |
|---|---|---|---|
| CN | 103383980 A * | 11/2013 | |
| WO | WO-2020130917 A1 * | 9/2020 | ........... H04B 10/116 |

OTHER PUBLICATIONS

BYU (Doping and Resistivity), https://cleanroom.byu.edu/ew_wafer_specs,; accessed Oct. 2, 2025 (Year: 2017).*

* cited by examiner

*Primary Examiner* — S. Behrooz Ghorishi

(57) ABSTRACT

A transparent wood surface imprinting optical device is provided. A preparation method for the device includes cleaning and drying surfaces of transparent wood, spin-coating polymethyl methacrylate (PMMA) on a substrate of the transparent wood to obtain a PMMA layer, and spin-coating an ultraviolet (UV) glue on the PMMA layer to obtain a UV glue layer; placing the transparent wood on a silicon wafer, attaching a transparent grating array imprinting template on the UV glue layer, exposing the UV glue layer, and removing the transparent grating array imprinting after the exposing, thereby to obtain a grating-structure-based transparent wood; and replacing the grating structure imprinting template by a lattice structure imprinting template to prepare lattice-structure-based transparent wood. The diffraction efficiency of the grating structure and the lattice structure on the transparent wood are greater and more stable than those of PMMA substrates.

5 Claims, 7 Drawing Sheets

TRANSPARENT WOOD SURFACE IMPRINTING OPTICAL DEVICE AND APPLICATION THEREOF

TECHNICAL FIELD

The disclosure relates to the technical field of optical devices, and particularly to a transparent wood surface imprinting optical device and application thereof.

BACKGROUND

Wood is regarded as a key development direction due to its abundant resources, high strength-to-weight ratio, low density, and functional potential. However, with the increase of using time, the wood exhibits many shortcomings including easy moisture absorption, cracking, warping, mildew, and photodegradation, these shortcomings greatly reduce the durability of wood in use and pose a potential safety hazard. Researchers have proposed many cell wall modification technologies or physical/chemical modification methods at molecular, atomic, and nano-scales. Natural wood is functionalized through physical densification, impregnation and high-temperature carbonization, extraction, grafting, polymerization, etherification, and esterification, and thus many kinds of wood with special functions have been prepared and applied in emerging fields such as bioengineering, flexible electronics, oil-water separation, seawater desalination, and energy storage.

As a kind of wood-based composite material, by in-situ depolymerization of lignin and backfilling polymer with matching refractive index, a transparent wood-based composite material (i.e., transparent wood) can be prepared with excellent optical and mechanical properties. The transparent wood has characteristics of a natural wood cell wall such as a skeleton structure and anisotropy, and strength of the transparent wood is higher than that of wood, toughness of the transparent wood is better than that of glass, and the transparent wood is more energy-efficient and environmentally friendly than plastic. In 1992, the concept of the transparent wood was introduced and the transparent wood was prepared by bleaching, dehydration, and impregnation of transparent resin. Since 2016, the Royal Institute of Technology in Sweden and the University of Maryland in the United States have reported research results on the structure and function of the transparent wood almost simultaneously. They put forward new research directions and ideas for the transparent wood, which has attracted wide attention from academia and industry. Researchers have shown that modifications of the transparent wood based on its excellent optical and mechanical properties, which enable the transparent wood have more functions such as heat insulation, luminescence and electrochromism, and will highlight the great potential in the fields of bio-based composites, optical materials, energy-saving building materials, electronic devices, solar panels, and smart sensors.

At present, research on functionalization treatments of the transparent wood mainly involves modifying the filled polymer and adding nanoparticles, or modifying a surface of the transparent wood to achieve the transparent wood with different functions. For example, reports on functional modifications of the transparent wood include bulk treatment of luminescent transparent wood, magnetic transparent wood, aesthetic transparent wood, photochromic transparent wood, and heat insulation transparent wood. Surface modification of the transparent wood achieves functionalization mainly through coating, etching, and layers assembly. Scientists have reported that coating poly (3,4-ethylene dioxythiophene)/poly (styrene sulfonic acid) on the transparent wood can prepare transparent conductive electrodes successfully. This electrochromic device can exhibit a bright magenta to transparent colorless change at different voltages, which has great potential for application in energy conversion and smart windows. The precise construction of micro-nano structures on the surface of the transparent wood endows the transparent wood with new functions, and the construction of micro-nano structures is efficient, fast, controllable, and easy to process. However, there are still few reports on this research direction, and further development of new technologies and products is still needed.

SUMMARY

In order to solve the above problems, a purpose of the disclosure is to provide a transparent wood surface imprinting optical device. The disclosure takes transparent wood as a substrate and imprints a surface of the transparent wood to construct a micro-nano structure (i.e., one of a grating structure and a lattice structure in the disclosure), thereby obtaining the transparent wood surface imprinting optical device. The transparent wood surface imprinting optical device has broad application prospects in fields such as optical devices, optical imaging, and optoelectronic devices.

In order to achieve the above purpose, the disclosure uses the following technical solutions.

The disclosure provides a transparent wood surface imprinting optical device, and a preparation method for the device includes: cleaning and drying a surface of the transparent wood; spin-coating polymethyl methacrylate (PMMA) on a substrate of the transparent wood to obtain a PMMA layer; spin-coating an ultraviolet (UV) glue on the PMMA layer to obtain a UV glue layer; and placing the transparent wood on a P-doped (100) n-type silicon wafer with a resistivity in a range of 1 ohm per centimeter (Ω/cm) to 10 Ω/cm, attaching a target template on the UV glue layer, exposing the UV glue layer, and removing the target template after the exposing, thereby to obtain target structure transparent wood (also referred to as the transparent wood surface imprinting optical device).

Specifically, the P-doped (100) n-type silicon wafer is configured to ensure that the transparent wood is evenly imprinted by the target template.

Specifically, the target template is one of a transparent grating array imprinting template and a lattice structure imprinting template. The grating structure is imprinted on the transparent wood when the target template is the transparent grating array imprinting template, and grating-structure-based transparent wood is obtained as the target structure transparent wood. The lattice structure is imprinted on the transparent wood when the target template is the lattice structure imprinting template, and lattice-structure-based transparent wood is obtained as the target structure transparent wood.

The disclosure further provides an application of the transparent wood surface imprinting optical device in preparation for optical or optoelectronic devices.

The disclosure further provides an application of the transparent wood surface imprinting optical device in optical imaging.

The beneficial effects of the disclosure are as follows: the transparent wood surface imprinting optical device provided by the disclosure is prepared by the combination of delignified wood, PMMA and surficial micro-nano structure, providing advantages for preparing optical devices which have the grating structure and the lattice structure on the surface of different transparent wood. In addition, under the irradiation of laser, the grating structure and the lattice structure on the transparent wood substrate produce colorful stripes (this phenomenon is called rainbow phenomenon), also known as structural coloration. The grating structure and the lattice structure on the transparent wood can occur diffraction, and the diffraction efficiency of the grating structure. The lattice structure on the different transparent wood are greater than that of a grating structure or a lattice structure imprinted on the pure PMMA substrate.

DETAILED DESCRIPTION OF EMBODIMENTS

Figure 1:
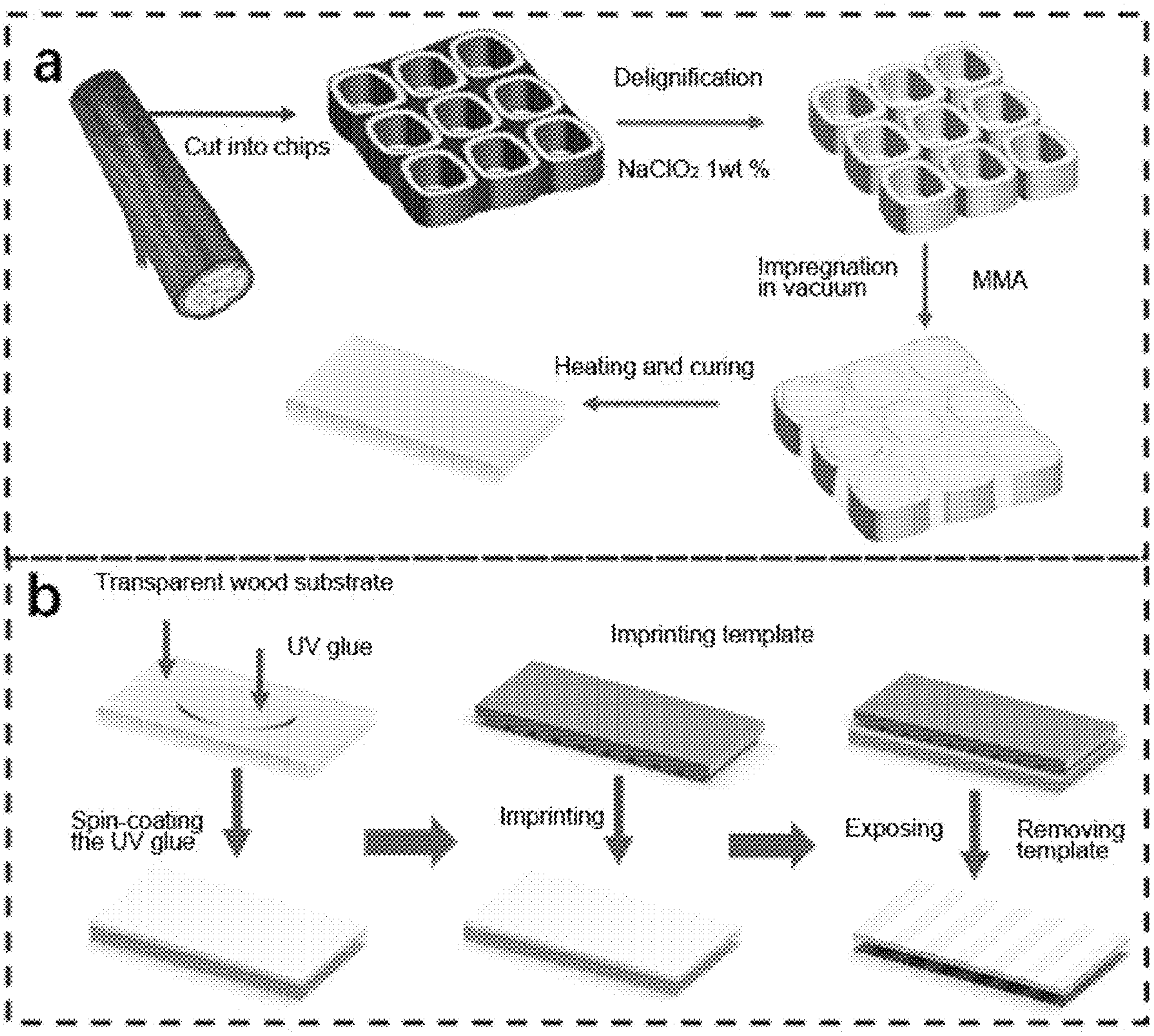
FIG. 1 illustrates a flowchart of preparing a transparent wood surface imprinting optical device; specifically, (a) of FIG. 1 is the schematic illustration of preparing transparent wood, and (b) of FIG. 1 illustrates a flowchart of imprinting a grating structure on the transparent wood.

The illustrated embodiments are provided to better demonstrate the disclosure, and the disclosure is not limited to the illustrated embodiments. Therefore, those skilled in the art make non-essential modifications and adjustments to the disclosure according to the illustrated embodiments should be within the scope of protection of the disclosure.

The terms used herein are for the purpose of describing particular embodiments only and are not intended to limit the disclosure. Expressions in the singular include expressions in the plural unless the context clearly indicates a different meaning. As used herein, it is understood that terms such as "include", "have", "comprise" and the like are intended to indicate the presence of features, numbers, operations, components, parts, devices, materials, or combinations thereof. The terms of the disclosure are disclosed in the specification are not intended to exclude the possibility that one or more other features, numbers, operations, components, parts, devices, materials or combinations thereof may be present or may be added. As used herein, "/" may be interpreted as "and" or "or" in a case.

A transparent wood surface imprinting optical device provided by an embodiment of the disclosure, a preparation method for the transparent wood surface imprinting optical device includes: cleaning and drying a surface of the transparent wood, spin-coating PMMA on a substrate of the transparent wood to obtain a PMMA layer, and spin-coating a UV glue on the PMMA layer to obtain a UV glue layer; and placing the transparent wood on a P-doped (100) n-type silicon wafer with a resistivity in a range of 1 Ω/cm to 10 Ω/cm, attaching a target template on the UV glue layer, exposing the UV glue layer, and removing the target template after the exposing, thereby to obtain target structure transparent wood. Specifically, the target template is one of a transparent grating array imprinting template and a lattice structure imprinting template. When the target template is the transparent grating array imprinting template, the target structure transparent wood is grating-structure-based transparent wood, and when the target template is the lattice structure imprinting template, the target structure transparent wood is lattice-structure-based transparent wood.

It is noted that relevant research has reported that constructing micro-nano structures on wood can achieve the thermal stability of light transmission. In relevant research, cellulose aggregates are exposed from skeletons of cell walls by removing lignin, and then the wood is replicated in a mold under a wet condition, and the mold is maintained in a dry condition, so as to achieve precise replication of fine patterns with sizes ranging from 40 nanometers (nm) to 50 micrometers (μm), and multi-sized structures which include nano-sized structures arranged on a micrometer-sized hemispherical surface may be obtained. The relevant research also demonstrates the use of surface-imprinted wood as a micro-lens array, and the surface-imprinted wood exhibits excellent imaging capability and thermal stability even at a temperature up to 150 Celsius degrees (° C.). However, under a condition whose relative humidity is high or a humid condition, moisture makes the surface-imprinted wood be prone to shrinkage and swelling since the wood itself is sensitive to moisture, thereby to lead the dimensional instability of optical properties of the surface-imprinted wood.

The disclosure uses transparent wood as a substrate and uses precise imprinting on its surface to construct micro-nano structures of the transparent wood, thereby obtaining a transparent wood surface imprinting optical device. In addition, the transparent wood surface imprinting optical device in the embodiments of the disclosure, under the irradiation of a laser, produces colorful stripes (this phenomenon is called rainbow phenomenon) on two types of structures (i.e., grating structure and lattice structure) of the transparent wood substrate, also known as structural coloration. The grating structure and the lattice structure on the transparent wood can occur diffraction. The diffraction efficiency of the grating structure and the lattice structure on the transparent wood is greater than that of a grating structure or a lattice structure imprinted on the pure PMMA substrate.

In some embodiment, the preparation method for the transparent wood surface imprinting optical device further includes:

Step 1, taking balsa wood as a raw material, performing delignification on the balsa wood to prepare delignified porous wood; and Step 2, performing vacuum-repeated impregnations on the delignified porous wood to prepare the transparent wood.

In some embodiments, in the step 1 of the preparation method for the transparent surface imprinting optical device, the performing delignification (i.e., a method of removing lignin) includes: using sodium chlorite to prepare a bleaching solution with a mass fraction in a range of 0.5% to 1.5%, adjusting a pH value of the bleaching solution in a range of 4.5 to 4.7 with glacial acetic acid/acetic acid buffer solution, cutting the balsa wood into a wood veneer, immersing balsa wood veneer in the bleaching solution and cooking the balsa wood veneer at a temperature in a range of 75° C. to 85° C. to obtain delignified porous wood (i.e., balsa wood after removing lignin).

It should be noted that the removal of lignin (a component of wood that absorbs visible light) increases the porosity and permeability of the cell walls of wood, thereby providing more fluid channels for subsequent resin impregnation. At the same time, a honeycomb cell wall structure of natural wood and its original directional arrangement and multi-level assembly structure can still be maintained in the process of delignification.

In the step 2 of the preparation method for the transparent surface imprinting optical device, the vacuum-repeated impregnation includes: prepolymerizing MMA by using 2,2'-azobisisobutyronitrile as an initiator at a temperature in a range of 70° C. to 80° C. for 15 minutes; placing the prepolymerized MMA in ice water to rapidly cool down to an ambient temperature, and then placing the prepolymerized MMA into the delignified porous wood; impregnating the delignified porous wood filled by the prepolymerized MMA with a solution under a vacuum pressure in a range of −0.09 megapascals (MPa) to −0.08 MPa; wrapping the delignified porous wood between two layers of glass slides with aluminum foil, drying and curing the delignified porous wood; and taking out the delignified porous wood from the two layers of glass slides to obtain transparent wood.

An embodiment of the disclosure provides an application of the transparent wood surface imprinting optical device in preparation for optical or optoelectronic devices.

An embodiment of the disclosure provides an application of the transparent wood surface imprinting optical device in optical imaging.

It should be noted that there is currently a lack of research on functionalization of transparent wood through imprinting micro-nano structures on surfaces of the transparent wood. This precision imprinted transparent wood can broaden its application fields, such as in optical devices, optical imaging, optoelectronic devices, and other fields. In addition, by combining the microstructures and optical advantages of the transparent wood, the nano-imprinted grating structure and lattice structure on the surfaces of the transparent wood expand new application scenarios in fields such as optics, biology, and electronic devices.

In addition, since each of the grating structure and the lattice structure is arranged in a direction perpendicular to the wood fibers, based on an anisotropic fiber-based porous wood structure, if light propagates parallel to the longitudinal and tubular wood cell directions, resin-filled micropores can be considered as multimode waveguides with relatively high losses. When light is incident from the direction perpendicular to the wood fibers, the incident light diffracts under the barrier of nano-fibers, and the diffraction efficiency of the transparent wood is enhanced under actions of the micro-nano structures (i.e., the grating structure and the lattice structure) imprinted on the surface of transparent wood.

In order to better understand the disclosure, the content of the disclosure is further interpreted with specific embodiments, but the content of the disclosure is not limited to the following embodiments.

I. Preparation of a Transparent Wood Surface Imprinting Optical Device

Embodiment 1

The transparent wood surface imprinting optical device is prepared according to a flowchart illustrated by FIG. 1, and the preparation of the transparent wood surface imprinting optical device includes:

(1) using sodium chlorite to prepare a bleaching solution with a mass fraction of 1%, adjusting the pH value of the bleaching solution to 4.6 with glacial acetic acid/acetic acid buffer solution; cutting balsa wood with a thickness of 1 millimeters (mm) to obtain a balsa wood veneer with a size of 30 mm×20 mm; immersing the balsa wood veneer in the bleaching solution and boiling the balsa wood veneer for 6 hours at a temperature of 80° C., thereby to remove lignin for obtaining delignified wood (also referred to as delignified porous wood);

(2) prepolymerizing MMA by using 2,2'-azobisisobutyronitrile as an initiator at a temperature of 75° C. for 15 minutes; placing the prepolymerized MMA in an ice water to rapidly cool the prepolymerized MMA to an ambient temperature, and then placing the prepolymerized MMA into the delignified wood; impregnating the delignified wood filled by the prepolymerized MMA with a solution for 30 minutes under a vacuum pressure in a range of −0.09 MPa to −0.08 MPa, and repeating the impregnating for three times to ensure complete impregnation of the prepolymerized MMA; wrapping the delignified wood between two layers of glass slides with aluminum foil, curing the delignified wood under 75° C. for 4 hours in an oven; and taking out the delignified wood from the two layers of glass slides to obtain transparent wood; and (3) cleaning a surface of the transparent wood ultrasonically with acetone or ethanol, then drying the transparent wood with nitrogen; setting a rotary speed of a spin coater to 3000 revolutions per minute (rpm), spin-coating PMMA on a substrate of the transparent wood to obtain a PMMA layer, and spin-coating a UV glue (self-made in a laboratory) on the PMMA layer to obtain a UV glue layer; then placing the transparent wood on a P-doped (100) n-type silicon wafer with a resistivity in a range of 1 Ω/cm to 10 Ω/cm, attaching a transparent grating array imprinting template on the UV glue layer, placing the transparent wood and the transparent grating array imprinting template into a UV exposure device, and exposing the UV glue layer for 10 minutes under a nitrogen atmosphere to cure the UV glue layer; removing the transparent grating array imprinting template after the exposing to obtain a grating structure in the UV glue layer, and the grating structure being matched with the transparent grating array imprinting template, thereby to obtain grating-structure-based transparent wood (i.e., a transparent wood surface imprinting optical device); and replacing the transparent grating array imprinting template by a lattice structure imprinting template in the above operations to prepare lattice-structure-based transparent wood (i.e., another transparent wood surface imprinting optical device).

In addition, PMMA is taken as a substrate to prepare two PMMA substrates for comparison with the grating-structure-based transparent wood and the lattice-structure-based transparent wood. The transparent grating array imprinting template is used to imprint a grating structure on the PMMA material to prepare one PMMA substrate, and the lattice structure imprinting template is used to imprint a lattice structure on the PMMA material to prepare another PMMA substrate.

II. Surface Characterization of the Transparent Wood Surface Imprinting Optical Device

Embodiment 2

The balsa wood, the delignified balsa wood, and the transparent wood in the embodiment 1 are performed with component analyses, and the results are shown in TABLE 1.

TABLE 1

Component analyses of the balsa wood, the delignified balsa wood, and the transparent wood

| Material | Lignin (%) | Hemicellulose (%) | Cellulose (%) | Mass loss (%) | PMMA (%) |
|---|---|---|---|---|---|
| Balsa wood | 24.6 ± 1.4 | 24.8 ± 1.3 | 50.6 ± 2.9 | — | — |
| Delignified balsa wood | 2.1 ± 0.3 | 18.6 ± 1.4 | 49.1 ± 1.8 | 30.2 ± 1.9 | — |
| Transparent wood | 0.4 ± 0.1 | 3.2 ± 0.2 | 8.5 ± 0.3 | — | 87.9 ± 3.0 |

Embodiment 3

Figure 2:
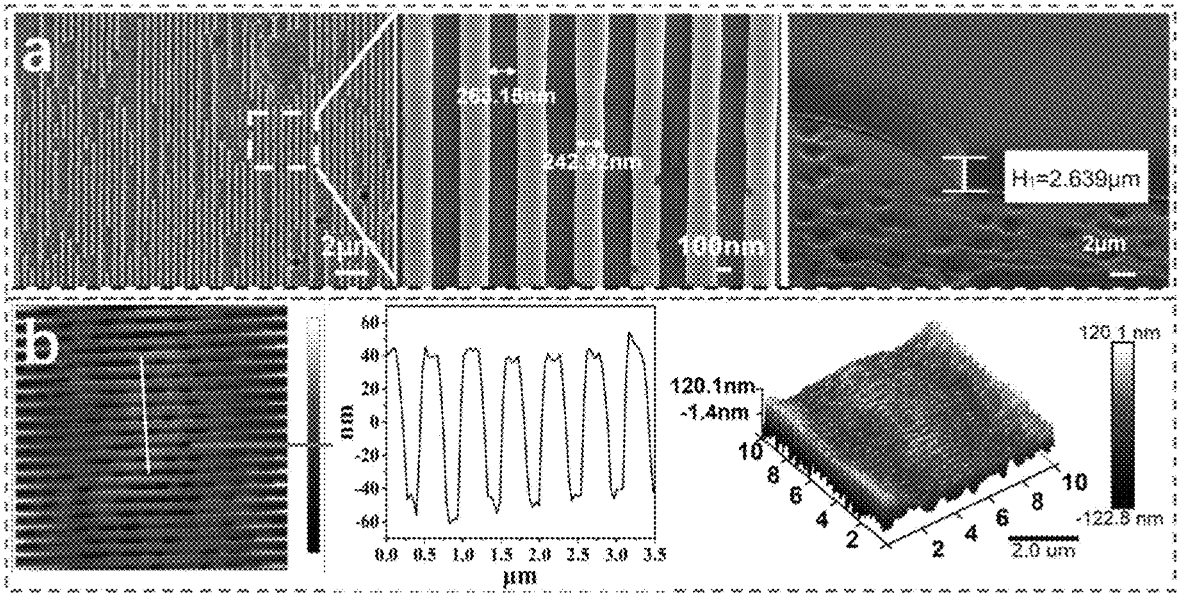
FIG. 2 illustrates surface morphologies of the grating structure on grating-structure-based transparent wood; specifically, (a) of FIG. 2 illustrates a scanning electron microscope (SEM) microstructure, and (b) of FIG. 2 illustrates an atomic force microscopy (AFM) microstructure.
Figure 3:
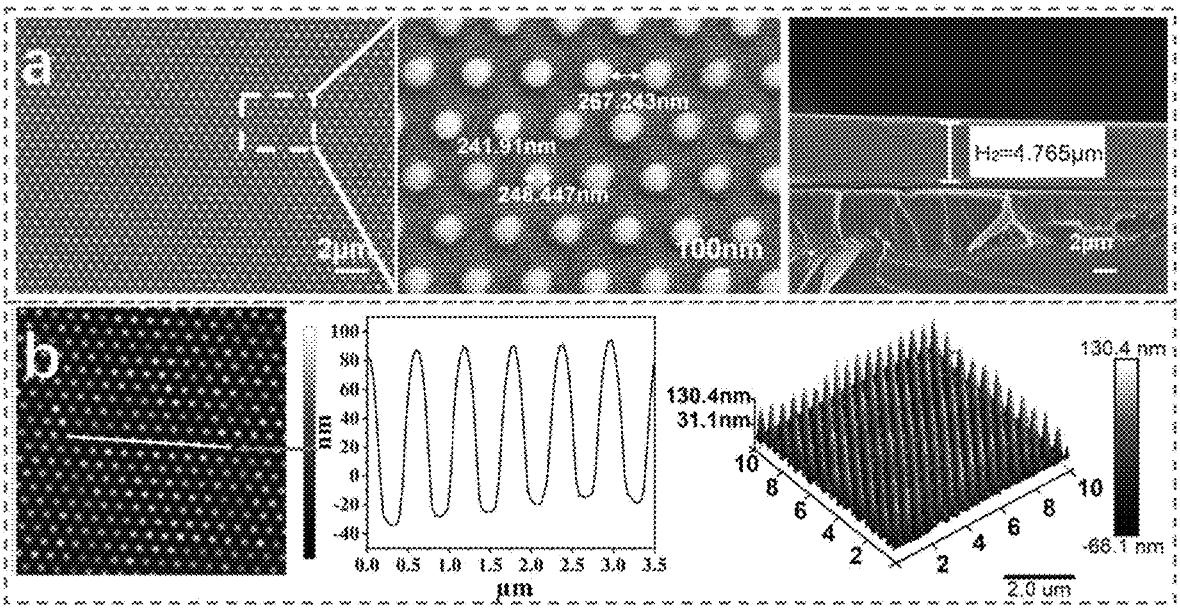
FIG. 3 illustrates surface morphologies of a lattice structure on lattice-structure-based transparent wood; specifically, (a) of FIG. 3 illustrates a SEM microstructure, and (b) of FIG. 3 illustrates an AFM microstructure.

A SEM and an AFM are used to observe the grating-structure-based transparent wood prepared in the embodiment 1, and the results are shown in FIG. 2. Specifically, (a) of FIG. 2 illustrates a SEM micrograph, and (b) of FIG. 2 illustrates an AFM micrograph The SEM and the AFM are used to observe the lattice-structure-based transparent wood prepared in the embodiment 1, and the results are shown in FIG. 3. Specifically, (a) of FIG. 3 illustrates a SEM micrograph, and (b) of FIG. 3 illustrates an AFM micrograph.

Figure 4:
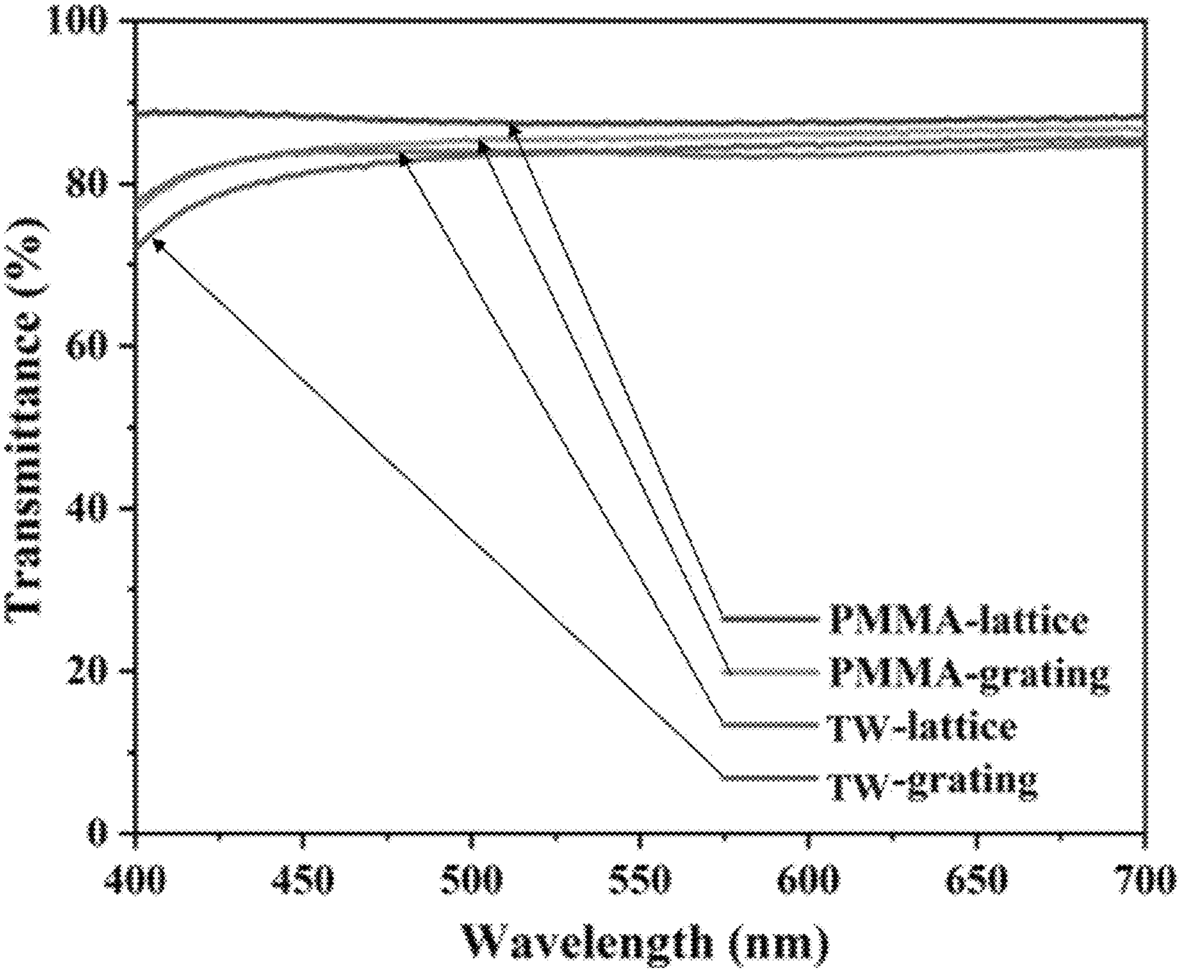
FIG. 4 illustrates transmittances of a grating structure and a lattice structure on different PMMA substrates, as well as transmittances of the grating-structure-based transparent wood and the lattice-structure-based transparent wood.

Transmittance tests are performed on the grating structure and the lattice structure on different PMMA substrates (i.e., the PMMA substrate imprinted with the grating structure and the PMMA substrate imprinted with the lattice structure) in the embodiment 1, as well as the grating-structure-based transparent wood and the lattice-structure-based transparent wood, and the results of the transmittance tests are shown in FIG. 4.

Figure 5:
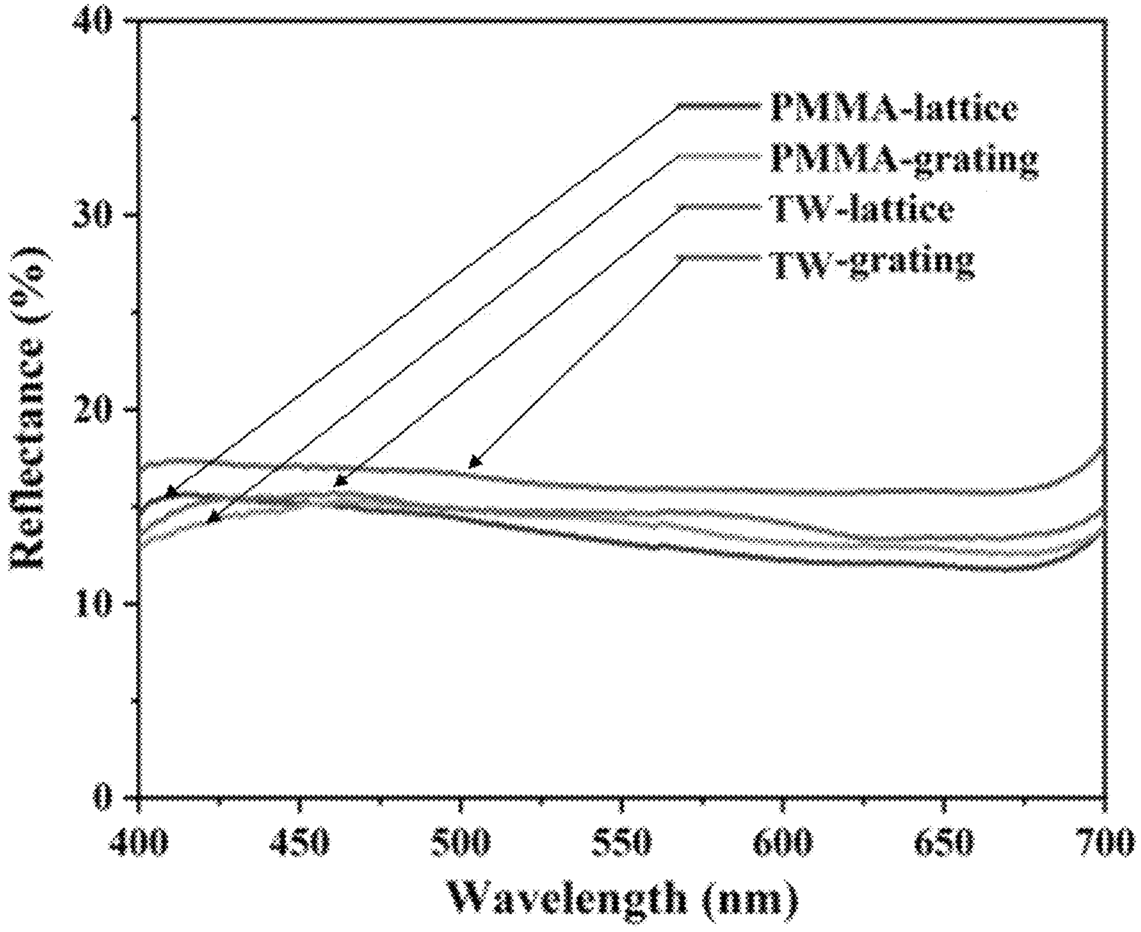
FIG. 5 illustrates reflectivities of the grating structure and the lattice structure on the different PMMA substrates, as well as reflectivities of the grating-structure-based transparent wood and the lattice-structure-based transparent wood.

Reflectivity tests are performed on the grating structure and lattice structure on the different PMMA substrates in the embodiment 1, as well as the grating-structure-based transparent wood and the lattice-structure-based transparent wood, and the results of the reflectivity tests are shown in FIG. 5.

Figure 6:
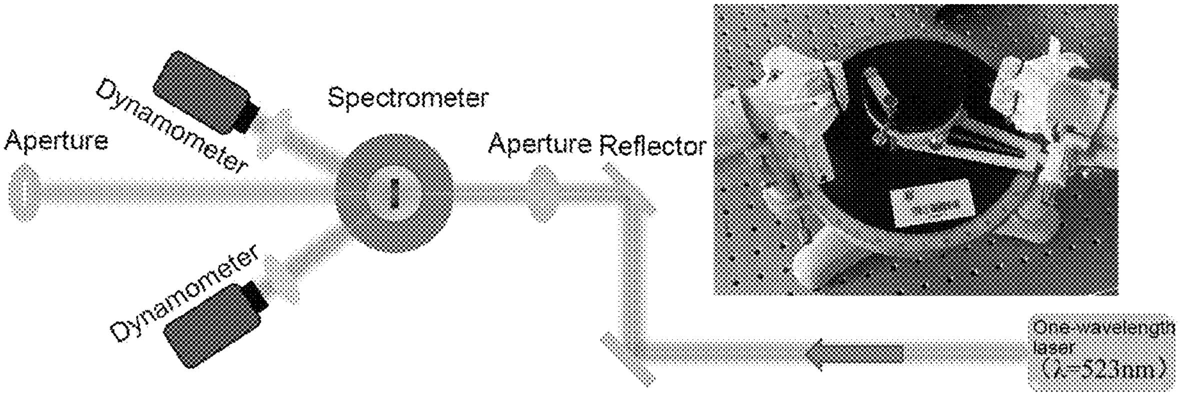
FIG. 6 illustrates a schematic diagram of a diffraction pattern and efficiency measurement device.
Figure 7:
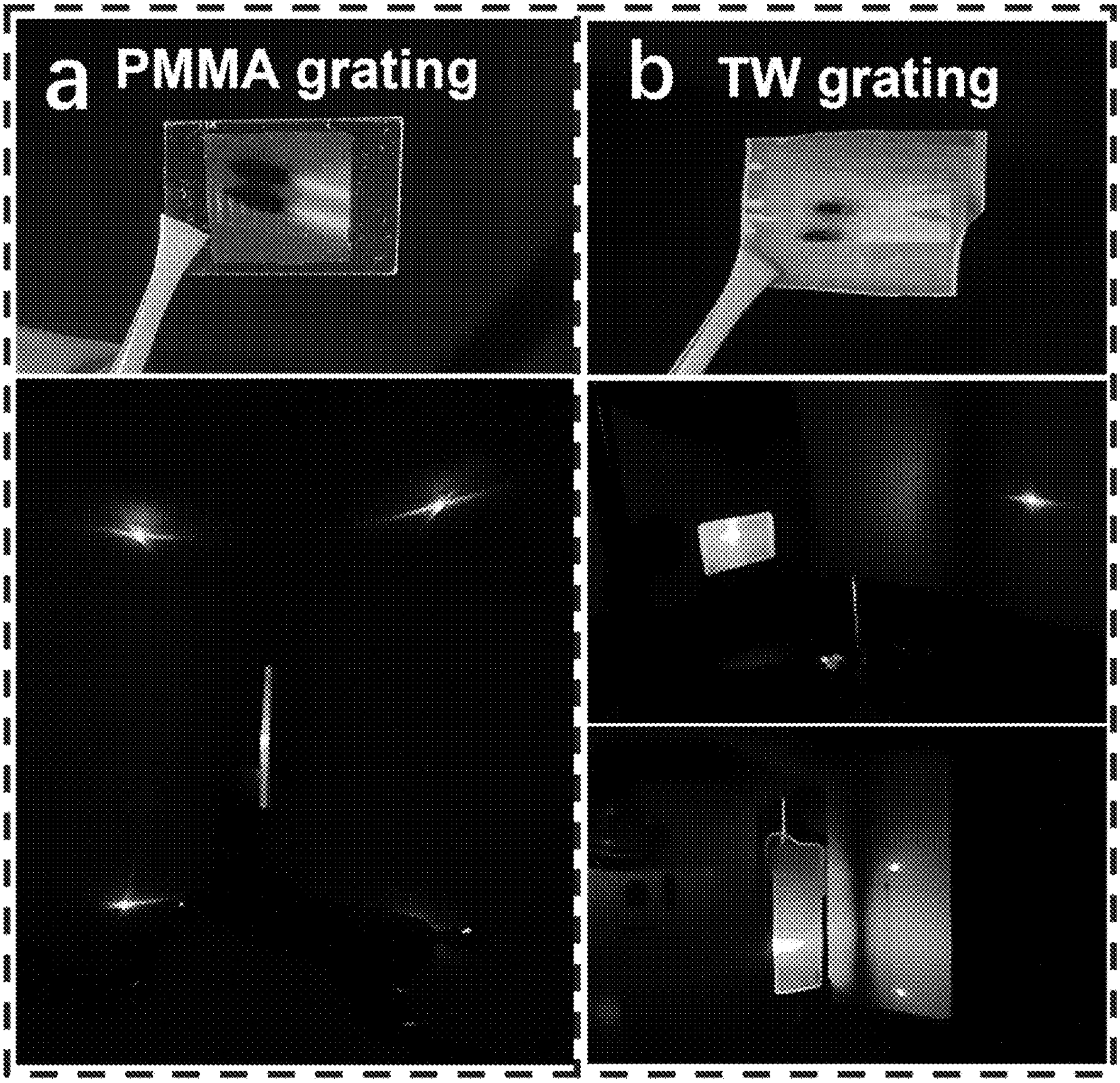
FIG. 7 illustrates a structural coloration and a diffraction pattern of the grating structure on the PMMA substrate, as well as a structural coloration and a diffraction pattern of the grating structure on the grating-structure-based transparent wood; specifically, (a) of FIG. 7 illustrates a result of the PMMA substrate and (b) of FIG. 7 illustrates a result of the grating-structure-based transparent wood.

The diffraction pattern and efficiency measurement device shown in FIG. 6 is used to perform structural coloration tests and diffraction pattern tests on the grating structure on the PMMA substrate and the grating structure on the grating-structure-based transparent wood in the embodiment 1. The results are shown in FIG. 7, specifically, (a) of FIG. 7 illustrates a result of the PMMA substrate and (b) of FIG. 7 illustrates a result of the grating-structure-based transparent wood.

Figure 8:
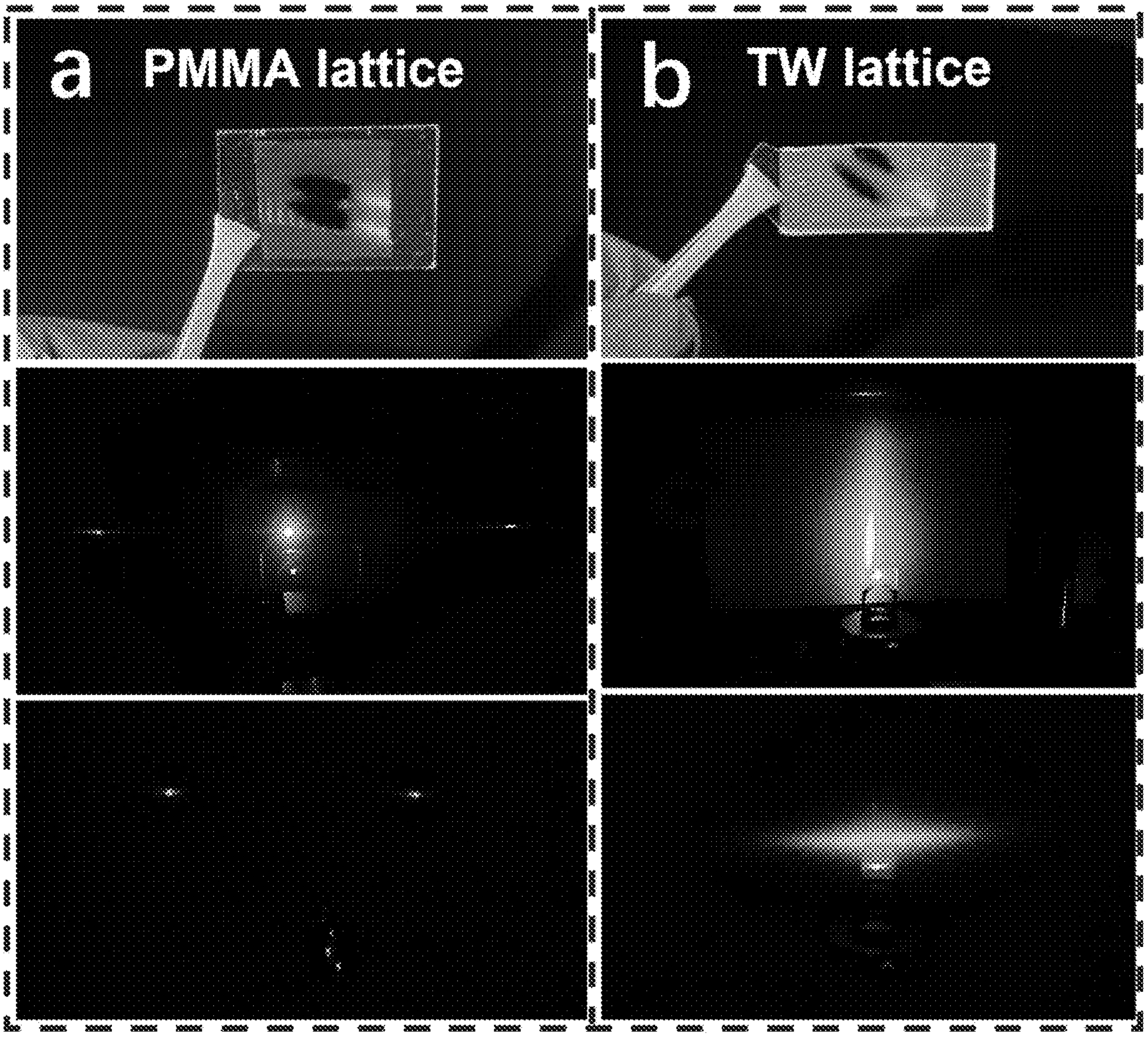
FIG. 8 illustrates a structural coloration and a diffraction pattern of the grating structure on the PMMA substrate, as well as a structural coloration and a diffraction pattern of the grating structure on the grating-structure-based transparent wood; specifically, (a) of FIG. 8 illustrates a result of the PMMA substrate and (b) of FIG. 8 illustrates a result of the lattice-structure-based transparent wood.

The diffraction pattern and efficiency measurement device shown in FIG. 6 is used to perform structural coloration tests and diffraction pattern tests on the lattice structure on the PMMA substrate and the lattice structure on the lattice-structure-based transparent wood in the embodiment 1. The results are shown in FIG. 8, specifically, (a) of FIG. 8 illustrates a result of the PMMA substrate and (b) of FIG. 8 illustrates a result of the lattice-structure-based transparent wood.

Figure 9:
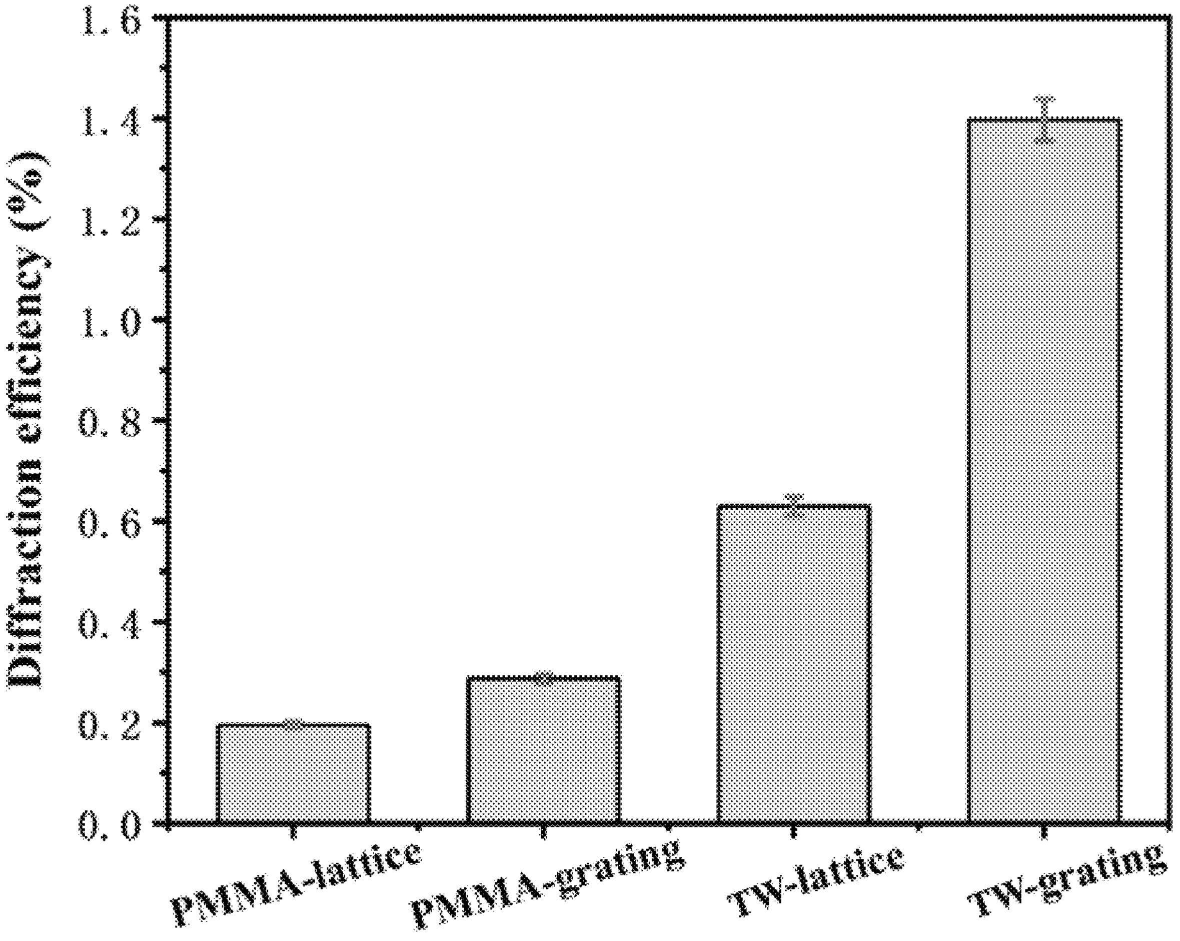
FIG. 9 illustrates diffraction efficiency of the grating structure and the lattice structure on the different PMMA substrates, as well as diffraction efficiency of the grating-structure-based transparent wood and the lattice-structure-based transparent wood.

Diffraction effect tests are performed the grating structure and the lattice structure on the different PMMA substrates, as well as the grating-structure-based transparent wood and the lattice-structure-based transparent wood, and the results are shown in FIG. 9.

Finally, it should be noted that the above embodiments are only used to illustrate the technical solution of the disclosure and not to limit it. Although the disclosure has been described in details with reference to the above embodiments, ordinary those skilled in the art should understand that the technical solutions of the disclosure can be modified or equivalently replaced without departing from the purpose and scope of the technical solutions of the disclosure, and these modifications and replacements should be within the scope of the claims of the disclosure.

What is claimed is:

1. A preparation method for a transparent wood surface imprinting optical device, comprising: preparation of transparent wood and preparation of target structure transparent wood;

wherein the preparation of transparent wood comprises:

taking balsa wood as a raw material, and cutting the balsa wood into a wood veneer;

using sodium chlorite to prepare a bleaching solution with a mass fraction in a range of 0.5% to 1.5%;

adjusting, by using one of glacial acetic acid/acetic acid buffer solution, a potential of hydrogen (pH) value of the bleaching solution to be in a range of 4.5 to 4.7;

immersing the balsa wood veneer in the bleaching solution and cooking the balsa wood veneer at a temperature in a range of 75 Celsius degrees (° C.) to 85° C. to obtain delignified porous wood;

prepolymerizing methyl methacrylate (MMA) by using 2,2'-azobisisobutyronitrile as an initiator at a temperature in a range of 70° C. to 80° C. for 15 minutes, to obtain prepolymerized MMA;

placing the prepolymerized MMA in ice water to cool the prepolymerized MMA to an ambient temperature, and then adding the prepolymerized MMA into the delignified porous wood;

impregnating the delignified porous wood filled by the prepolymerized MMA with a solution under a vacuum pressure in a range of −0.09 megapascals (MPa) to −0.08 MPa;

wrapping the delignified porous wood between two layers of glass slides with aluminum foil, and drying and curing the delignified porous wood; and taking out the delignified porous wood from the two layers of glass slides to obtain the transparent wood;

wherein the preparation of target structure transparent wood comprises:

cleaning and drying a surface of the transparent wood;

spin-coating polymethyl methacrylate (PMMA) on a substrate of the transparent wood to obtain a PMMA layer;

spin-coating an ultraviolet (UV) glue on the PMMA layer to obtain a UV glue layer and thereby obtaining PMMA and UV glue coated transparent wood; and placing the PMMA and UV glue coated transparent wood on a P-doped (100) n-type silicon wafer with a resistivity in a range of 1 ohm per centimeter (Ω/cm) to 10 Ω/cm, attaching a target template on the UV glue layer, exposing the UV glue layer, and removing the target template after the exposing to obtain target structure transparent wood;

wherein the P-doped (100) n-type silicon wafer is configured to ensure that the PMMA and UV glue coated transparent wood is evenly imprinted by the target template;

wherein the target template is one of a transparent grating array imprinting template and a lattice structure imprinting template; and wherein in a situation that the target template is the transparent grating array imprinting template, the target structure transparent wood is grating-structure-based transparent wood, and in a situation that the target template is the lattice structure imprinting template, the target structure transparent wood is lattice-structure-based transparent wood.

2. A preparation method for a transparent wood surface imprinting optical device comprises:

cleaning and drying a surface of transparent wood;

spin-coating PMMA on a substrate of the transparent wood to obtain a PMMA layer;

spin-coating a UV glue on the PMMA layer to obtain a UV glue layer and thereby obtaining PMMA and UV glue coated transparent wood; and placing the PMMA and UV glue coated transparent wood on a P-doped (100) n-type silicon wafer with a resistivity in a range of 1 Ω/cm to 10 Ω/cm, attaching a target template on the UV glue layer, exposing the UV glue layer, and removing the target template after the exposing to obtain target structure transparent wood;

wherein the P-doped (100) n-type silicon wafer is configured to ensure that the PMMA and UV glue coated transparent wood is evenly imprinted by the target template;

wherein the target template is one of a transparent grating array imprinting template and a lattice structure imprinting template; and wherein in a situation that the target template is the transparent grating array imprinting template, the target structure transparent wood is grating-structure-based transparent wood, and in a situation that the target template is the lattice structure imprinting template, the target structure transparent wood is lattice-structure-based transparent wood.

3. The preparation method for the transparent wood surface imprinting optical device as claimed in claim 2, further comprising:

step 1, taking balsa wood as a raw material, and performing delignification on the balsa wood to prepare delignified porous wood; and step 2, performing vacuum-repeated impregnation on the delignified porous wood to obtain the transparent wood.

4. The preparation method for the transparent wood surface imprinting optical device as claimed in claim 3, wherein in the step 1, the performing delignification comprises:

cutting the balsa wood into a balsa wood veneer;

using sodium chlorite to prepare a bleaching solution with a mass fraction in a range of 0.5% to 1.5%;

adjusting, by using one of glacial acetic acid or acetic acid buffer solution, a pH value of the bleaching solution to be in a range of 4.5 to 4.7; and immersing the balsa wood veneer in the bleaching solution and boiling cooking the balsa wood veneer at a temperature in a range of 75° C. to 85° C. to obtain the delignified porous wood.

5. The preparation method for the transparent wood surface imprinting optical device as claimed in claim 4, wherein in the step 2, the vacuum-repeated impregnation comprises:

prepolymerizing MMA by using 2,2'-azobisisobutyronitrile as an initiator at a temperature in a range of 70° C. to 80° C. for 15 minutes, to obtain prepolymerized MMA;

placing the prepolymerized MMA in ice water to cool the prepolymerized MMA to an ambient temperature, and then adding the prepolymerized MMA into the delignified porous wood;

impregnating the delignified porous wood filled by the prepolymerized MMA with a solution under a vacuum pressure in a range of −0.09 MPa to −0.08 MPa;

wrapping the delignified porous wood between two layers of glass slides with aluminum foil, and drying and curing the delignified porous wood; and taking out the delignified porous wood from the two layers of glass slides to obtain the transparent wood.

* * * * *